US 6,557,498 B1

(12) United States Patent
Smierciak et al.

(10) Patent No.: US 6,557,498 B1
(45) Date of Patent: May 6, 2003

(54) NIGHT SAFETY PET ILLUMINATION MARKER

(76) Inventors: David Allen Smierciak, 14701 Krems Ave., Maple Heights, OH (US) 44137; Rochelle Ringer, 14701 Krems Ave., Maple Heights, OH (US) 44137

( * ) Notice: Subject to any disclaimer, the term of this patent is extended or adjusted under 35 U.S.C. 154(b) by 0 days.

(21) Appl. No.: 09/636,280

(22) Filed: Aug. 10, 2000

(51) Int. Cl.7 ................................................ A62B 35/00
(52) U.S. Cl. ...................................... 119/858; 119/859
(58) Field of Search ............................... 119/795, 858, 119/859; 362/565, 570, 571

(56) References Cited

U.S. PATENT DOCUMENTS 4,173,201 A * 11/1979 Chao et al. ................. 119/859
5,370,082 A * 12/1994 Wade .......................... 119/859
5,630,382 A *  5/1997 Barbera et al. .............. 119/859
5,950,571 A *  9/1999 Schade ........................ 119/859
5,970,921 A * 10/1999 Fulton ......................... 119/859
6,055,942 A *  5/2000 Romanak et al. ........... 119/859

* cited by examiner

Primary Examiner—Charles T. Jordan
Assistant Examiner—Elizabeth Shaw
(74) Attorney, Agent, or Firm—John D. Gugliotta

(57) ABSTRACT

A pet collar forms a linearly elongated substrate spine upon which are mounted a series of illumination elements. A pair of electrical communication conductors provide for electrical communication among the illumination elements. A light sensor switch is in series between a power source and the illumination elements breaks the electrical circuit upon sensing of sufficient ambient light levels.

1 Claim, 2 Drawing Sheets

NIGHT SAFETY PET ILLUMINATION MARKER

RELATED APPLICATIONS

The present invention was first described in Disclosure Document No. 470,182, filed on Feb. 29, 2000. There are no previously filed, nor currently any co-pending applications, anywhere in the world.

BACKGROUND OF THE INVENTION

1. Field of the Invention

The present invention relates generally to pet leashes, collars, and similar restraining devices and, more particularly, to electrically illuminated pet leashes and collars 2. Description of the Related Art The act of walking a dog is a pleasure enjoyed by many pet owners. The ability to get outside and experience nature and the surroundings is a simple joy. There are also the great health benefits associated with exercise for both the dog and the human walker. However, many pet owners have jobs which limit their walking time to night time hours, or many pet owners just enjoy walking at night. While the health benefits are the same, there is an increased danger from not being seen by motorists while walking at night. While reflective clothing may help the owner, the pets being walked are still at risk. The risk increases greatly should the pet get away and run free. Additionally, there are some work dogs such as police dogs, rescue dogs and the like who work at night without the benefit of a nearby handler who would benefit from increased visibility.

In the related art a search did not disclose any patents that read directly on the claims of the instant invention; however, the following references were considered related.

The following patents disclose an illuminated pet leash:

U.S. Pat. No. 5,967,095 issued in the name of Greves;

U.S. Pat. No. 5,850,807 issued in the name of Keeler;

U.S. Pat. No. 5,558,044 issued in the name of Nasser, Jr. et al.;

U.S. Pat. No. 4,887,552 issued in the name of Hayden; and

U.S. Pat. No. 4,513,692 issued in the name of Kuhnsman et al.

U.S. Pat. No. 5,429,075 issued in the name of Passarella et al. discloses a pet leash and flashlight combination.

And, the following patents describe an illuminated pet collar:

U.S. Pat. No. 5,140,946 issued in the name of Pennock et al.;

U.S. Pat. No. 5,074,251 issued in the name of Pennock; and

U.S. Pat. No. 4,895,110 issued in the name of Lo Cascio.

Consequently, a there is a need for a means by which dogs and other pets can be provided with increased visibility during nighttime hours.

SUMMARY OF THE INVENTION

Therefore, it is an object of the invention to provide for a means by which dogs and other pets can be provided with increased visibility during nighttime hours.

It is a feature of the present invention to supply an illumination source provided by light emitting diodes around the perimeter of collar or along length of leash controlled by an on/off/automatic switch with light sensor.

Briefly described according to one embodiment of the present invention, disclosed is a system and method by which pet collars and leashes are illuminated. A series of small incandescent lamps or light-emitting diodes (LED's) would be provided in a clear plastic cover around the outside perimeter of the collar or on both sides of the pet leash. Internal wiring will connect the lamps to am on/off/automatic switch and a light sensor which would activate the light during periods of low level ambient light. A small battery, such as those used to power a watch or calculator would provide power for the invention.

It is envisioned that the invention would be used by owners of pets such as dogs and cats that frequently walk or go out at night, or by dogs involved in outdoor activities during nighttime or low-light hours such as hunting dogs, police dogs, fire dogs and the like.

The use of the present invention provides for an enhanced level of safety for all pets and owners who venture outside at night.

An advantage of the present invention is that it provides for provides increased visibility for pets at night.

Another advantage of the present invention is that it can be used on cats, dogs, or any pet that uses a collar and/or leash.

Another advantage of the present invention is that it provides increased safety for pet owners who may be walking animal as well.

Another advantage of the present invention is that it is safe and will not harm the animal to which it is attached.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
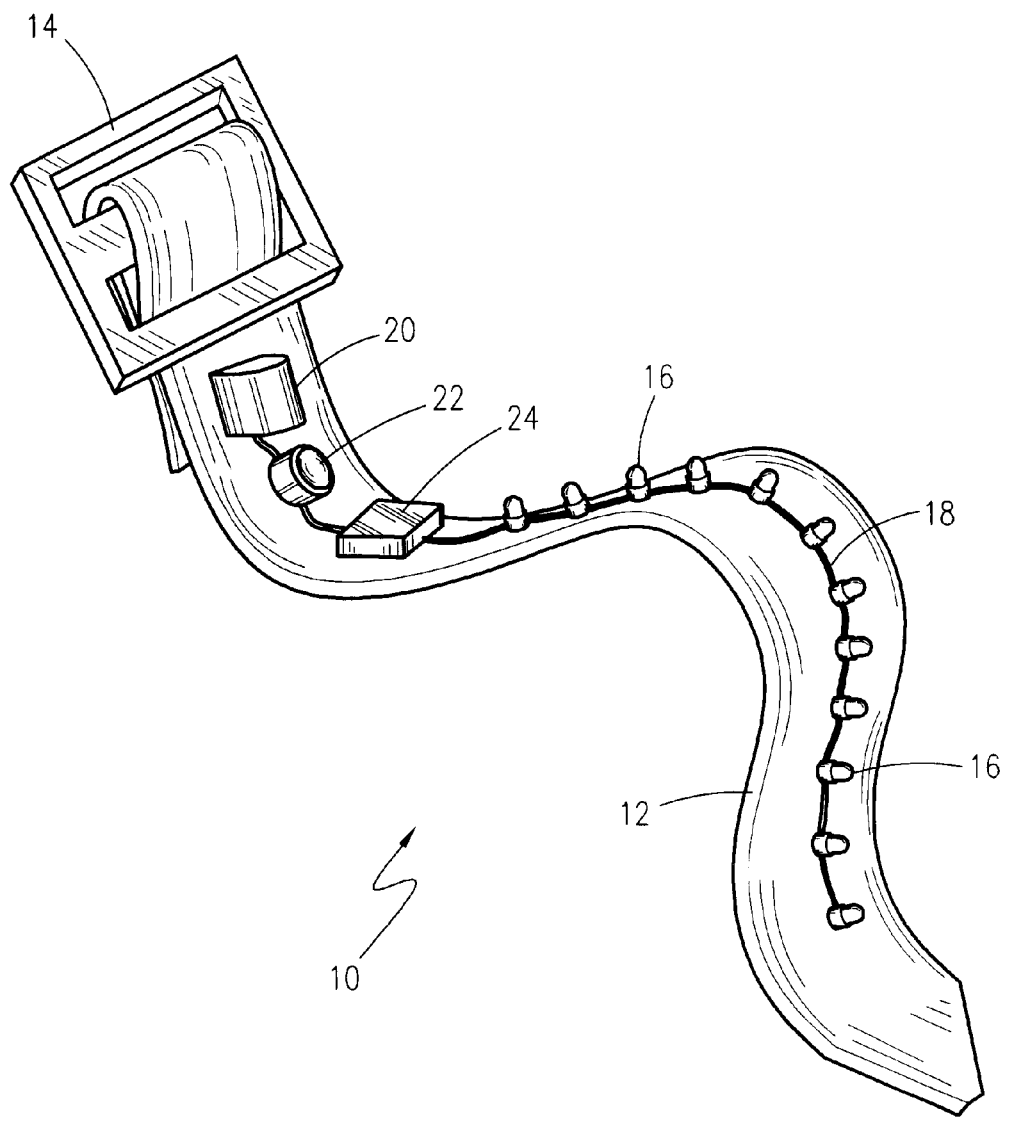
FIG. 1 is a perspective view of a night safety pet illumination marker in combination with a pet collar 12 according to the preferred embodiment of the present invention.
Figure 2:
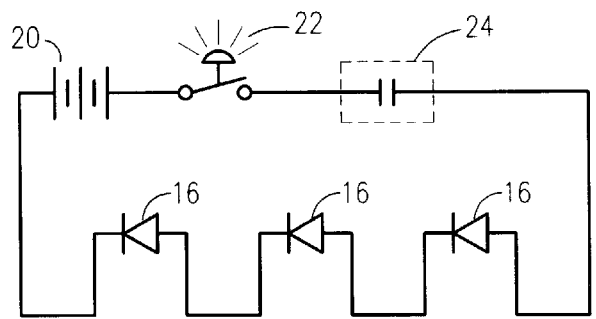
FIG. 2 is an electrical schematic diagram of the operating circuitry for use therewith.

Referring now to FIGS. 1–2, a night safety pet illumination marker, generally noted as 10, is shown, according to the present invention, in combination with a pet collar 12. The pet collar 12 can be of any otherwise conventional type, and is merely meant to support and carry the illuminated marking means as is described herein. Therefore, for purposes of illustration, and not limitation, the pet collar 12 is displayed herein as a conventional, linearly elongated strap having a collar attachment 14, such as a buckle, affixed at one end such as to provide adjustable attachment about a pet. The linearly elongated strap forms substrate spine to which a series of illumination elements 16 are supported in a linear pattern. Although any conventional means of illumination can be utilized, the best mode of the present invention incorporates conventional light emitting diodes as the illumination elements 16, and are in electrical communication in parallel with one another via a pair of electrical communication conductors 18. An electrical power source 20 imparts electrical energy into the circuit created by the conductors 18. The currently envisioned best mode envisions the use of one, or a series, of button cell type batteries for providing the necessary electrical potential in a small, lightweight, and easily portable fashion affixed to the collar 12.

In order to impart the specifically adapted functionality unique to a night safety pet illumination marker of the present disclosure, a control element is required within the circuit created by the conductors 18. To this end, a light sensor switch 22 is provided in series between the power source 10 and the illumination elements 16. The light sensor switch 22 functions as an actuating relay, breaking the electrical circuit upon sensing of sufficient ambient light levels. In practical application, the light sensor switch as used in a conventional portable task light known as a "night-light", adapted for use with the electrical power source 20 and illumination elements 16.

Further, an additional flashing timing unit 24 can be provided in electrical series along one leg of the circuit. The flashing timing unit 24 can perform a time delay, or power oscillating function such as to allow for illumination effects, such as flashing or strobing of the illumination elements 16 when the circuit is triggered by the light sensor switch 22.

Figure 3:
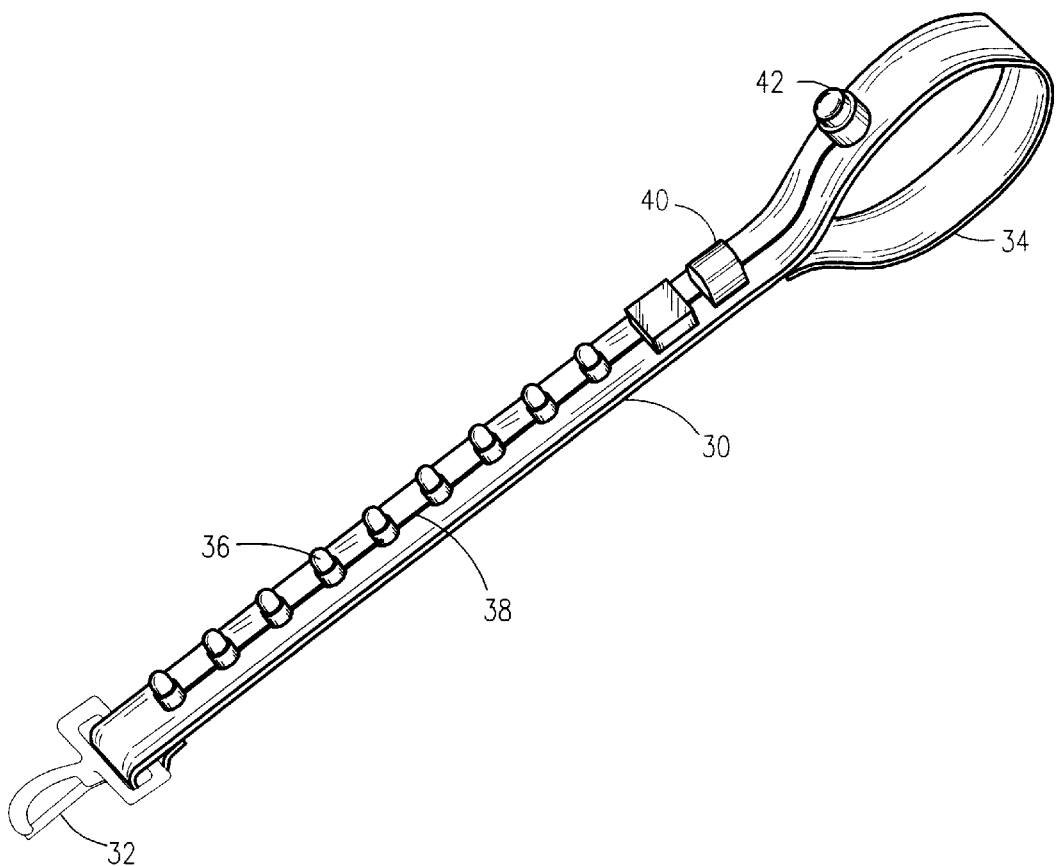
FIG. 3 is perspective view of a night safety pet illumination marker in combination with a pet leash 30 according to an alternate embodiment of the present invention.

Referring to FIG. 3, a night safety pet illumination marker is provided in combination with a pet leash 30 according to an alternate embodiment of the present invention. The pet leash 30 can be of any otherwise conventional type, and is merely meant to support and carry the illuminated marking means as is described herein. Therefore, for purposes of illustration, and not limitation, the pet leash 30 12 is displayed herein as a conventional, linearly elongated strap having an attachment clamp 32 affixed at one end opposite a handle loop 34 to function as a hand hold. The linearly elongated strap forms substrate spine to which a series of illumination elements 36 are supported in a linear pattern. Although any conventional means of illumination can be utilized, as described above conventional light emitting diodes are envisioned as the illumination elements 36, and are in electrical communication in parallel with one another via a pair of electrical communication conductors 38. An electrical power source 40 imparts electrical energy into the circuit created by the conductors 38. The currently envisioned best mode envisions the use of one, or a series, of button cell type batteries for providing the necessary electrical potential in a small, lightweight, and easily portable fashion affixed to the leash 30.

In order to impart the specifically adapted functionality unique to a night safety pet illumination marker of the present disclosure, a control element is required within the circuit created by the conductors 38. To this end, an activation switch 42 is provided in series between the power source 40 and the illumination elements 36. The switch 42 functions as a manual relay, breaking or initiating the electrical circuit upon manual activation by the user.

Further, an additional flashing timing unit 24 can be provided in electrical series along one leg of the circuit. The flashing timing unit 44 can perform a time delay, or power oscillating function such as to allow for illumination effects, such as flashing or strobing of the illumination elements 36 when the circuit is triggered by the switch 42.

2. Operation of the Preferred Embodiment

In operation, the present invention can be merely decorative, but also function as a night safety pet illumination marker for protecting a pet by making it more visible at night. By affixing the collar to the pet, the illumination elements will be powered upon initiation by the light sensor switch 22 upon diminishing ambient light levels. Similarly, use of the leash when affixed to the pet can provide a night safety pet illumination marker for both pet and owner when illuminated.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A night safety pet illumination marker comprising:
   a pet collar forming a linearly elongated substrate spine;
   a series of illumination elements supported along said substrate spine in a linear pattern;
   a pair of electrical communication conductors for providing electrical communication among said illumination elements;
   an electrical power source for imparting electrical energy into the circuit created by said electrical communication conductors;
   a light sensor switch in series between said power source and said illumination elements, said light sensor switch for functioning as an actuating relay breaking the electrical circuit upon sensing of sufficient ambient light levels; and
   a flashing timing unit provided in electrical series within said circuit, said flashing timing unit performing a power oscillating function such as to allow for illumination effects, such as flashing or strobing of said illumination elements.

* * * * *